R. KRAUSE.
AUTOMOBILE LIFTING APPARATUS.
APPLICATION FILED DEC. 21, 1915.
1,190,913.
Patented July 11, 1916.
2 SHEETS—SHEET 1.
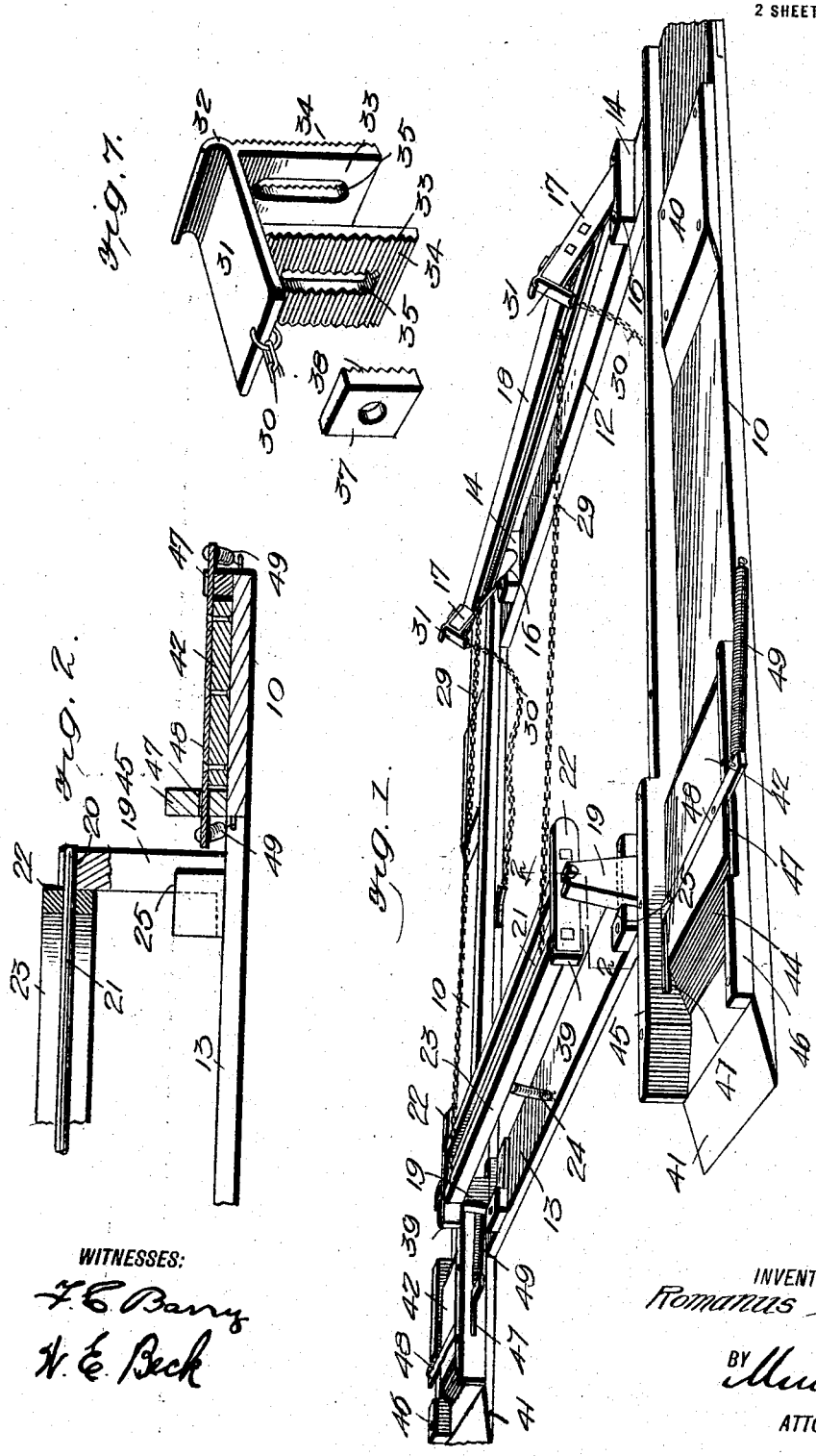
WITNESSES:
INVENTOR
Romanus Krause
BY
ATTORNEYS

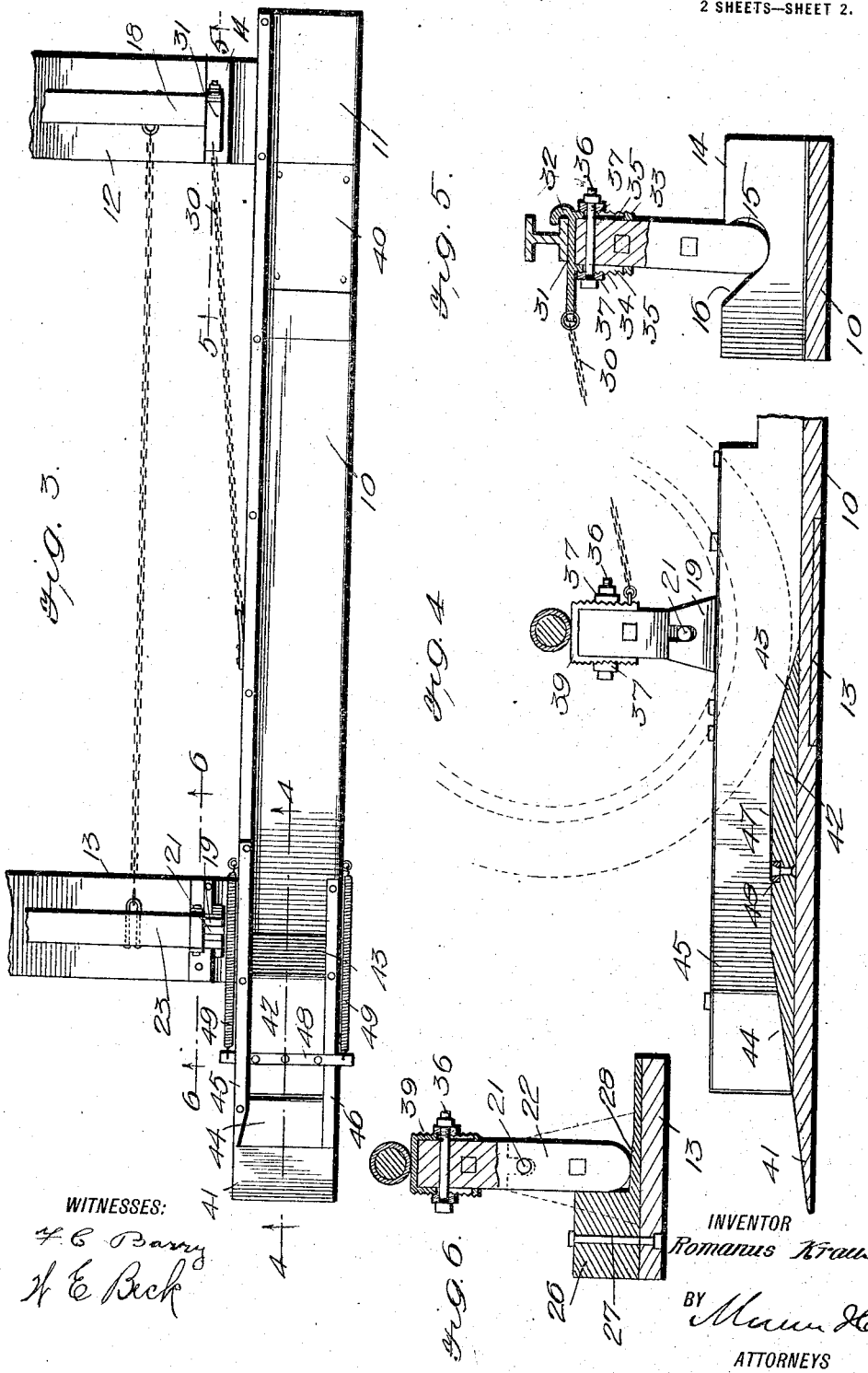

UNITED STATES PATENT OFFICE.

ROMANUS KRAUSE, OF BELHAVEN, NORTH CAROLINA, ASSIGNOR OF ONE-HALF TO JOHN G. TOOLY, OF BELHAVEN, NORTH CAROLINA.

AUTOMOBILE-LIFTING APPARATUS.

1,190,913.  Specification of Letters Patent.  Patented July 11, 1916.

Application filed December 21, 1915. Serial No. 68,070.

*To all whom it may concern:*

Be it known that I, ROMANUS KRAUSE, a citizen of the United States, and a resident of Belhaven, in the county of Beaufort and State of North Carolina, have invented an Improvement in Automobile-Lifting Apparatus, of which the following is a specification.

This invention is an improvement in supports and has particular reference to a lifting apparatus for automobiles.

An object of the invention is the provision of a novel mechanism for raising an automobile off of its tires when the same is stored in a garage so that the effectiveness of the tires is prolonged and, briefly stated, such mechanism includes a base frame in which are pivotally mounted front and rear vehicle supporting frames normally in a tilted position, said front frame being adapted to be engaged by the front axle of the vehicle and swung to a substantially vertical position whereupon the rear frame will be actuated in a like manner.

Another object of the invention is to provide longitudinally movable elevating members mounted on the base frame and adapted to be engaged by the rear wheels of the vehicle to raise the rear axles slightly above the rear supporting frame after which the said elevating members are moved rearwardly and from under the wheels by reason of the frictional contact therewith while the same are rotating thus permitting the rear axle to be lowered and rest upon its supporting frame.

A still further object is the provision of an apparatus of this character which is simple in construction, easy to manufacture, durable, and effective in carrying out the purpose for which it is designed.

The inventive idea involved is capable of receiving a variety of mechanical expressions, one of which, for the purpose of illustrating the invention, is shown in the accompanying drawing, in which—

Figure 1 is a perspective view of the apparatus constructed in accordance with the invention. Fig. 2 is a section on the line 2—2 of Fig. 1. Fig. 3 is a fragmentary top plan view of the apparatus. Fig. 4 is a section on the line 4—4 of Fig. 3. Fig. 5 is a section on the line 5—5 of Fig. 3. Fig. 6 is a section on the line 6—6 of Fig. 3. Fig. 7 is a detail perspective view of the axle engaging members carried by the front axle supporting frame.

There is illustrated in the drawings what is now believed to be a preferred embodiment of the invention, in which the apparatus comprises a base frame generally indicated by the numeral 10 and including longitudinal side members 11 and connected by transverse members 12 and 13. The front transverse member 12 is provided adjacent each end thereof with a bearing block 14 having a recess 15 therein provided with a rearwardly inclined surface 16. Mounted in these recesses are the end members 17 of the front vehicle supporting frame 18, said end members having their lower ends rounded to fit the bottom of the recesses 15. The frame 18 is adapted to normally rest in the tilted position shown in Fig. 1, and when in this position one edge of the end member 17 will engage the inclined surfaces 16.

The rear transverse member 13 of the base frame has mounted adjacent each end thereof a vertically arranged journal block 19 having a groove 20 in its upper end for receiving one end of a shaft 21 which passes centrally through the end members 22 of the rear vehicle supporting frame 23 whereby said frame is pivotally mounted in said bearings. This frame is normally retained in a horizontal position by means of a spring 24 having one end secured to said frame and its other end to the transverse member 13. Each of the journal blocks 19 is reduced at its lower end as indicated at 25 to receive a portion of a horizontal bearing block 26 secured to the transverse member 13 by means of a bolt 27 as best shown in Fig. 6. Each block 26 is provided with an inclined surface 28 which is engaged by the rounded end of each end member 22 of the rear frame 23 when the latter is swung to a vertical position in a manner to be presently described. Engagement of the end members with this inclined surface will raise the shaft 21 from engagement with the bottom of the grooves 20 in the journal blocks 19, thus relieving said shaft of the strain occasioned by the weight of the vehicle whereby said weight will be carried by the entire frame.

Flexible connecting elements 29, preferably chains, have their ends secured to the front and rear vehicle supporting frames 18 and 23 so that when the front axle of the vehicle moves the front frame 18 to a substantially vertical position, in a manner to appear in the course of the description, said chains will also swing the rear frame 23 to a similar position, whereupon the latter frame will also be elevated as just described. It is to be noted from Fig. 5 of the drawings that the front frame 18, when supporting the axle, will be slightly past its vertical position so that there will be no danger of the same inadvertently swinging backward when the vehicle is mounted upon the apparatus. In order to limit the forward movement of the front frame 18 the same has connected thereto certain ends of the flexible elements 30 the other ends thereof being secured to the longitudinal members 11 of the frame.

Each of the end members 17 of the front vehicle supporting frame 18 has secured thereto at its upper end an axle engaging plate or member 31 having its forward end turned up as indicated at 32 in order to provide an obstruction in the path of the axle of the vehicle so that the frame 18 may be moved to vertical position. These members 31 are preferably made vertically adjustable in order to accommodate the apparatus to different sized vehicles and for this purpose said members 31 are preferably provided with depending arms 33 arranged in parallel relation and having their outer faces corrugated as indicated at 34. These arms are adapted to receive therebetween the upper ends of the end members 17 and are each provided with a vertically arranged slot 35 through which passes the fastening bolt 36, said bolt having mounted thereon the nuts 37 having corrugated faces 38 adapted to engage the similar surface 34 of the arms 33 so that after the plate 31 has been adjusted to any desired height the same is effectively retained in position. The end members 22 of the rear frame 23 are also provided with rear axle engaging plates generally indicated by 39 and constructed substantially the same as the members 31 with the exception that the curved end 32 is not employed and the area of the top is not as large.

The longitudinal members 11 of the base frame 10 are provided at their forward ends and adjacent the transverse member 12 with the stationary front wheel elevating members 40. The rear ends of said longitudinal members 11 are inclined as indicated at 41 so as to facilitate the passage of the vehicle onto the frame and adjacent said rear ends said members have mounted thereon the longitudinally movable rear wheel elevating members 42 having their front and rear ends inclined as indicated at 43 and 44, respectively. These members are mounted between the guide flanges 45 and 46 arranged upon the inner and outer edges of each member 11, respectively, and said flanges are provided with oppositely disposed slots 47 for receiving the ends of a transverse arm 48 embedded in the member 42, the forward movement of the latter member being limited by contact of said arm with the forward ends of the slots 47. The members 42 are normally retained in a forward position by means of coiled springs 49 each of which is secured at one end to the adjacent end of the arm 48 while its other end is secured to the member 11 as shown in Figs. 1 and 3. When the vehicle is driven onto the apparatus and the frames have been moved to their supporting positions, the rear tires of the vehicle will engage the members 42 at the point of intersection of the forward inclined surface with the flat top surface of said members so that continued rotation of the wheels will, by reason of the frictional contact, force said members 42 rearwardly and from under said wheels against the tension of the springs 49 whereupon the rear axle of the vehicle, which has been slightly elevated above the axle engaging members 39 of the rear frame, will be lowered upon said latter members.

When it is desired to remove the vehicle from the apparatus, the rotation of the rear wheels is reversed and through the action of the springs 49, which tend to draw the members 42 forwardly, and the frictional contact between the tires and said members 42, the latter will again be drawn under the wheels thus giving them sufficient bearing surface to move the vehicle rearwardly and off of the base frame. Upon disengagement of the axles with their respective supporting frames the same will be returned to their normal tilted positions by means of the spring 24 and the flexible connections 29.

What is claimed is:

1. An apparatus of the character described comprising a base frame including longitudinal and transverse members, a front axle supporting frame pivotally mounted upon one of said transverse members and normally in a tilted position, journals carried by the other transverse member, a rear axle supporting frame pivoted in said journals and normally in substantially horizontal position, flexible connections between said front and rear axle supporting frames, and means carried by said base frame for raising said rear axle supporting frame from its journals when said frame is swung to a substantially vertical position.

2. An apparatus of the character described comprising a base frame, swinging front and rear axle supporting frames mounted in said base frame, connections between said swinging frames whereby the rear frame is moved to vertical position when the front frame is engaged by the front axle of the vehicle, means for elevating said rear frame as the same is being swung to vertical position, rear wheel elevating members movable longitudinally of said base frame and actuated by frictional contact between the same and said wheels to move rearwardly and from under said wheels whereby the rear axle of the vehicle is lowered onto its supporting frame, and means for returning said wheel elevating members to normal position while the vehicle is being removed from the apparatus.

3. An apparatus of the character described comprising swinging front and rear axle supporting frames adapted to be swung to vertical position by contact of a vehicle with one of said frames, means for elevating one of said frames as the same is being swung to vertical position, and longitudinally movable members for elevating the rear wheels of said vehicle and actuated to move rearwardly from under said wheels whereby the rear axle of the vehicle is lowered on its supporting frame.

4. An apparatus of the character described comprising swinging front and rear axle supporting frames adapted to be swung to vertical position by contact of a vehicle with one of said frames, means for elevating one of said frames as the same is being swung to vertical position, longitudinally movable members for elevating the rear wheels of said vehicle and actuated to move rearwardly from under said wheels whereby the rear axle of the vehicle is lowered on its supporting frame, guide flanges arranged on each side of said longitudinally movable members and having slots therein, a transverse arm secured to each of said longitudinally movable members and having its ends extending into the slots in said guide flanges whereby movement of said movable members is limited in both directions, and means secured to one end of said arm for returning said movable members to normal position while the vehicle is being moved from the apparatus.

ROMANUS KRAUSE.

Witnesses:
B. G. CREDLE,
FRANK SNYDER.

Copies of this patent may be obtained for five cents each, by addressing the "Commissioner of Patents, Washington, D. C."